UNITED STATES PATENT OFFICE.

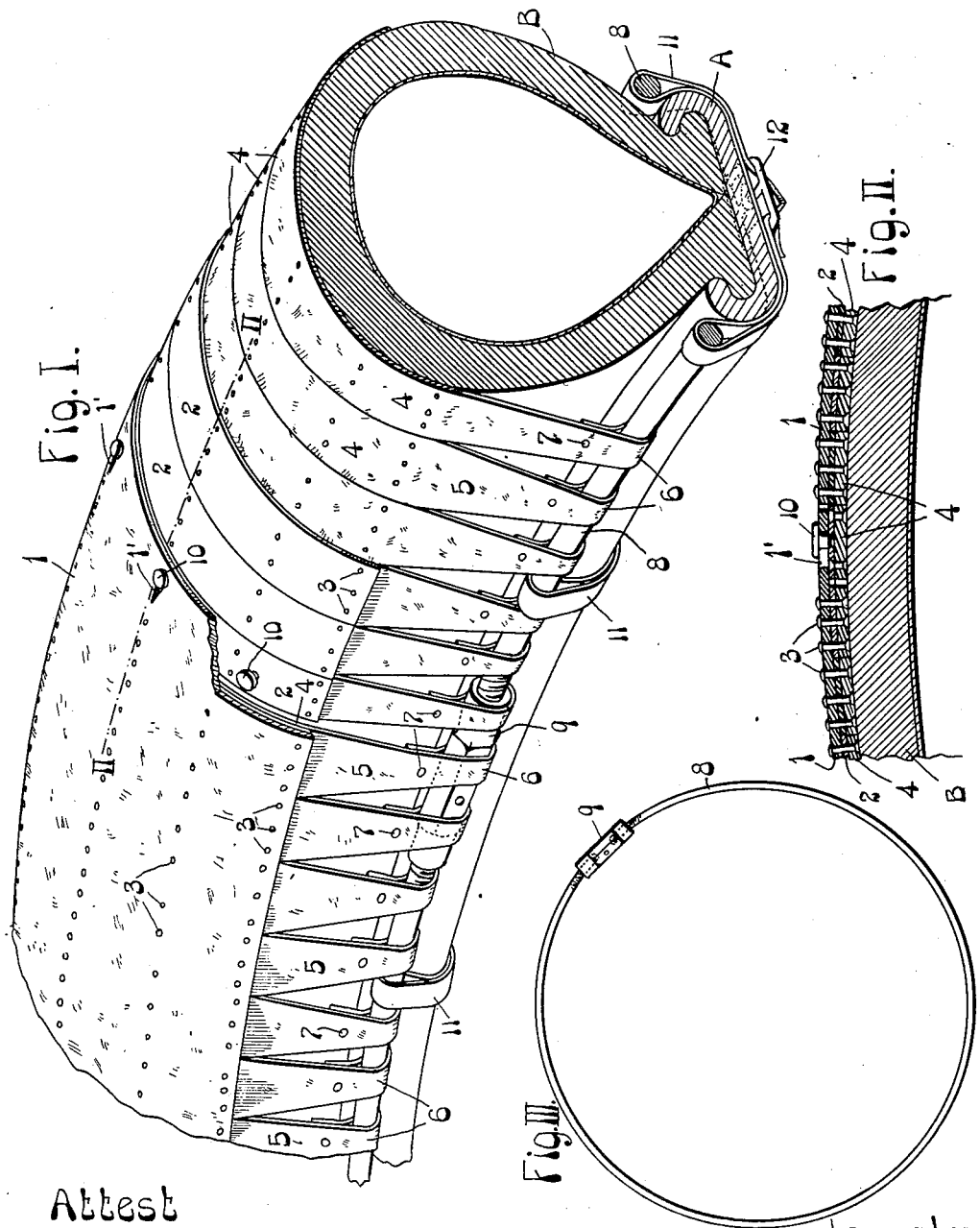

ROBERT J. MORRISON, OF ST. LOUIS, MISSOURI.

PROTECTOR FOR PNEUMATIC TIRES.

959,957.  Specification of Letters Patent.  Patented May 31, 1910.

Application filed December 24, 1909. Serial No. 534,828.

*To all whom it may concern:*

Be it known that I, ROBERT J. MORRISON, a citizen of the United States of America, residing in the city of St. Louis, in the State of Missouri, have invented certain new and useful Improvements in Protectors for Pneumatic Tires, of which the following is a full, clear, and exact description, reference being had to the accompanying drawings, forming part of this specification.

My invention relates to a protector for pneumatic tires used on vehicle wheels, and it has for its object the production of a protector of this description having a dual function, namely: that of preventing puncture of the pneumatic tire, and that of preventing what is commonly known as "blow outs" of pneumatic tires, and which result from excessive inner pressure in the tires without a safe-guard exterior of the tire to prevent bursting of the tire at some particular point in consequence of the existence of the excessive inner pressure.

Figure I is in part a perspective view and in part a cross section of a fragment of a pneumatic tire and a receiving rim therefor with my protector applied to the tire, portions of the protector being broken away to afford illustration of the parts beneath the broken away parts. Fig. II is an enlarged longitudinal section taken on line II—II, Fig. I. Fig. III is an elevation of one of the draw rings utilized in the protector.

In the accompanying drawings: A designates the rim of a vehicle wheel, and B a pneumatic tire seated in said rim. These parts may be of any usual construction as no invention is herein claimed for them, my improvement relating entirely to a protector for said tire.

1 designates a circumferential outer band which is of segmental shape in cross section and encircles the tire and lies upon transverse segmental outer metal strips 2, said outer band being composed of pliable material, preferably rawhide. The metal strips 2 extend transversely across the inner faces of the outer band 1 and are secured to said band by suitable means, such as rivets 3. These metal strips are made of such widths as to provide for the protector into which they enter being pliable so that they yield under pressure in a manner that would not be possible if, instead of metal strips, a single metallic band were utilized.

4 designates transverse segmental inner strips of pliable material, preferably rawhide, which lie under the transverse metal strips 2 and the outer band 1, these inner strips being secured to the outer band 1 and metal strips 2 by the same rivets 3 that serve to unite the metal strips 2 and the outer band 1. The edges of the inner strips 4 abut against each other throughout the entire series of inner strips, and said inner strips are provided with tapering extensions 5 that project beyond the edges of the protector proper, comprising the outer band 1, the metal strips 2 and the bodies of the inner strips 4. Each of said tapering extensions 5 terminates in a loop 6, the loops being preferably produced by returned bends in which the ends of the tapering extensions are held by rivets 7.

8 designates draw rings extending through the loops of the tapering extensions 5 at each side of the tire, and each of which rings is provided with a suitable take-up device, preferably a turnbuckle 9, by which the ring may be contracted in diameter by an inward draft upon the tapering extensions of the inner strips 4 to provide for the body portion of the tire protector being tightly drawn to the tread of the tire surrounded thereby, with the result that said body portion of the protector is rendered of service to resist outward force that may be imposed against the pneumatic tire by excessive air pressure therein at any particular point.

The ends of the body or tread portion of my tire protector are connected by buttons 10 carried by the metal strip 2 at one end of the body of the protector, which are adapted to be passed through buttonholes 1' in the outer band 1 at the other end of the body of the protector, said outer band extending beyond the parts of the body of the protector beneath it to a sufficient degree to overlap the metal strip 2 that carries the buttons 10.

To provide against the draw rings 8 being positioned adjacent to the rim that receives a pneumatic tire on which my protector is to be employed, or in proximity to the tire, instead of being spaced apart from the tire or rim as would be obviously objectionable, I utilize keeper strips 11 that extend around the draw rings and transversely of the tire receiving rim, each of said keeper straps being provided with a buckle 12 by which adjustment may be made in the keeper strap to carry the draw rings inwardly toward the tire or its receiving rim to any desired extent.

It will be observed that the protector herein described furnishes an efficient protector for a pneumatic tire against punctures, and at the same time provides an efficient guard against the injury to pneumatic tires by "blow outs" inasmuch as the body of the protector may be held to the tread of the tire in any desired degree of firmness, with the object in view of providing for inward pressure against the tread of the tire in excess of any outward air pressure in the tire that is likely to occur.

I claim:

A tire protector comprising transverse inner pliable strips having extensions at both ends formed to provide loops, transverse metal strips overlying the inner pliable strips, a circumferential outer pliable band surrounding all of said strips, rivets passing through the metal strips and connecting the inner pliable strips to the outer pliable band, adjustable draw rings extending through said loops, and buttons secured to one of said metal strips, one end of said pliable band being provided with button-holes adapted to receive said buttons.

In testimony whereof, I have hereunto affixed my signature, this 22nd day of December, 1909.

R. J. MORRISON.

In the presence of—
 E. B. LINN,
 M. C. HAMMON.